July 1, 1947.   S. R. OLDHAM   2,423,203
METHOD OF MAKING BLOWPIPE NOZZLE BLANKS
Filed Feb. 20, 1943
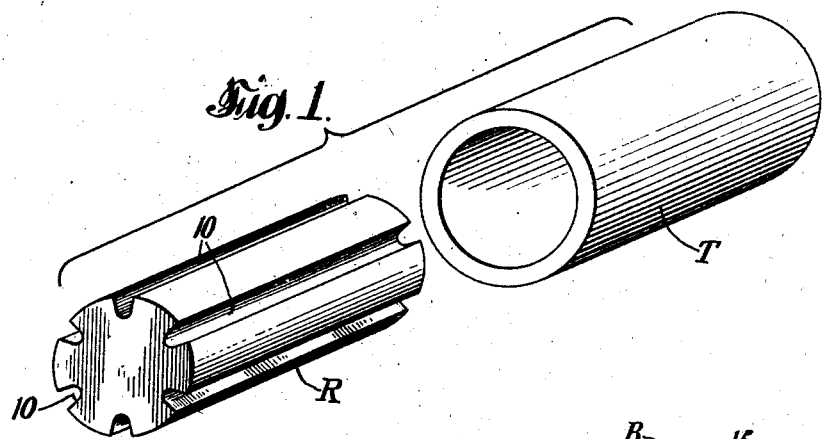
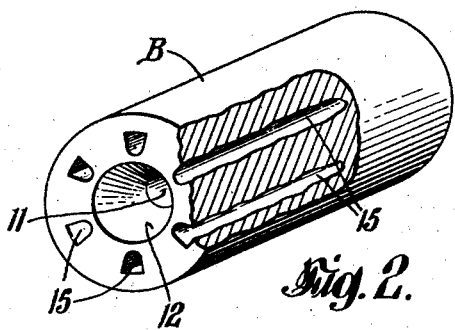
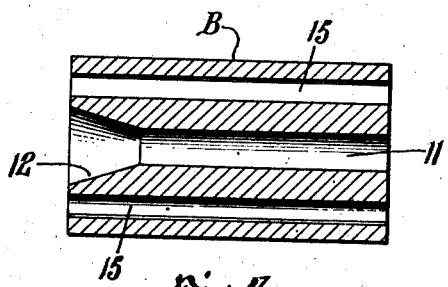
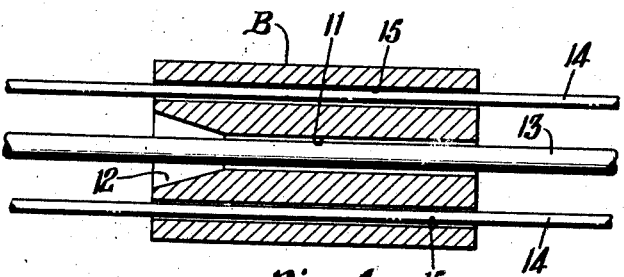
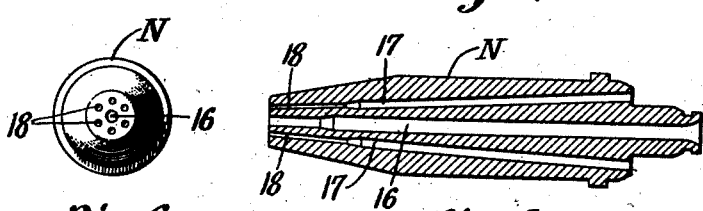
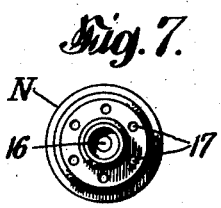
INVENTOR
SAMUEL R. OLDHAM
BY
ATTORNEY Patented July 1, 1947

2,423,203

UNITED STATES PATENT OFFICE 2,423,203

METHOD OF MAKING BLOWPIPE NOZZLE BLANKS

Samuel R. Oldham, West Orange, N. J., assignor to Union Carbide and Carbon Corporation, a corporation of New York Application February 20, 1943, Serial No. 476,544

1 Claim. (Cl. 29—157)

This invention relates to swaged blowpipe nozzles, and more particularly to an improved method of making composite blanks adapted to be subsequently swaged into nozzles.

The main objects of the invention are to provide a method of making blowpipe nozzles that have uniform dimensions and operating characteristics, which method involves the use of readily available standard parts for the nozzle blank, and is inexpensive to perform; and a method of making homogeneous nozzle blanks from two metal members of simple shapes so that the resulting nozzles will resist disintegration even under severe service. Another object is to provide a composite blank or nozzle that is simple and economical in its parts.

According to the invention, blowpipe nozzles and the like are made by first telescoping a straight longitudinally grooved rod composed of ductile metal such as copper within a straight tube also composed of ductile metal such as copper. The rod and tube are then integrally united under heat and pressure, without any mandrels in the grooves, to form a composite blank that is entirely homogeneous and solid except for the longitudinal passages provided by such grooves. A central longitudinal hole is then drilled through the composite blank and one end is, in some cases, counterbored to produce a desired flame-hole circle when the blank is swaged to produce the nozzle. Mandrels are inserted in the longitudinal passages and center hole of the blank and the latter is swaged and finished in the usual way to form a desired type of nozzle.

Referring to the drawing:

Fig. 1 is a perspective view of a grooved rod and a tube in position for assembly;

Fig. 2 is a perspective view of a composite blank, after being center drilled and counterbored, and partly broken away to show the homogeneous nature of the metal;

Fig. 3 is a longitudinal sectional view of the blank;

Fig. 4 is a view similar to Fig. 3 showing the mandrels in position prior to a swaging operation;

Fig. 5 is a longitudinal sectional view of a resulting cutting nozzle; and

Figs. 6 and 7 are opposite end views of the nozzle.

The oxy-acetylene cutting nozzle N, for example, is formed from a nozzle blank B prepared for swaging by telescoping a straight rod R of malleable metal such as copper having circumferentially spaced longitudinally extending grooves 10, within a straight copper sleeve or tube T of similar metal. The rod R and tube T are then thoroughly heated in a furnace, or otherwise, and integrally united by the application of compression welding to provide a homogeneous metal member or one piece blank, preferably by a forging heat process at a temperature of the order of 1600° F. to 1700° F., while the rod-tube assembly is supported by dies and the grooves 10 are empty. Any type of press, such as a drop hammer, may be used to carry out the forging operation. After the forging operation, the composite blank B is drilled to provide a central hole 11 extending longitudinally therethrough and counterbored at 12; but the latter counterboring step may be omitted if a large flame-hole circle is desired in the finished nozzle. The counterboring is proportioned to produce a flame-hole circle of the desired diameter. The blank B is then annealed, pickled, and bright dipped; mandrels 13 and 14 are inserted in the hole 11, and also in the passages 15 resulting from the grooves 10 in the rod R; and swaging proceeds in the same manner as when standard drilled blanks are swaged. The cutting nozzle N is finally produced in the usual way, by a series of swaging steps as disclosed in Patent No. 2,243,184, for example, and has a central cutting oxygen passage 16 and preheat gas passages 17. The passages 17 are arranged in a cone about the passage 16 and terminate in ports 18 which are arranged in a circle the diameter of which, in the plane of the end face of the tip, equals that of the preheat flame circle.

A truly homogeneous weld is made between the straight members R and T by forging or squeezing the surfaces together at welding heat. Thus, even under severe service the nozzle N does not disintegrate. The tube or the grooved rod or both may be drawn or extruded to the proper size so that they fit when assembled together.

What is claimed is:

The method of making a blowpipe nozzle blank composed of ductile metal, such as copper, having an annular series of longitudinal passages, which comprises telescopically fitting a core consisting of a length of longitudinally grooved barstock of substantially constant external diameter throughout its length, within a tube consisting of an equal length of straight, commercial tubing of substantially constant internal diameter throughout its length, heating the resulting rod-tube assembly to a temperature of the order of 1600° F. to 1700° F., and supporting the so heated assembly between dies, while compression welding the tube on the bar so as to permanently unite the parts into one piece of homogeneous metal.

SAMUEL R. OLDHAM.

REFERENCES CITED

The following references are of record in the file of this patent:

UNITED STATES PATENTS

| Number | Name | Date |
|---|---|---|
| 2,254,757 | Smith | Sept. 2, 1941 |
| 525,676 | Burdon | Sept. 4, 1894 |
| 2,243,184 | Aronson et al. | May 27, 1941 |
| 2,267,623 | Self | Dec. 23, 1941 |
| 1,784,142 | Hosking | Dec. 9, 1930 |
| 2,239,202 | Rendleman | Apr. 22, 1941 |
| 1,650,394 | Shores | Nov. 22, 1927 |
| 1,436,931 | Albrecht | Nov. 28, 1922 |